(12) United States Patent
Chandran et al.

(10) Patent No.: US 6,832,565 B2
(45) Date of Patent: Dec. 21, 2004

(54) PULSE GASIFICATION AND HOT GAS CLEANUP APPARATUS AND PROCESS

(75) Inventors: Ravi Chandran, Ellicott City, MD (US); Momtaz N. Mansour, Highland, MD (US)

(73) Assignee: Manufacturing & Technology Conversion, Inc., Baltimore, MA (US)

( * ) Notice: Subject to any disclaimer, the term of this patent is extended or adjusted under 35 U.S.C. 154(b) by 0 days.

(21) Appl. No.: 10/445,289

(22) Filed: May 22, 2003

(65) Prior Publication Data

US 2004/0031450 A1 Feb. 19, 2004

Related U.S. Application Data

(60) Provisional application No. 60/382,302, filed on May 22, 2002.

(51) Int. Cl.⁷ ............................. F23J 15/00; F23B 7/00
(52) U.S. Cl. ...................................... 110/345; 110/342
(58) Field of Search ................................ 110/215, 233, 110/306, 315, 316, 342, 343, 345, 347; 48/202

(56) References Cited

U.S. PATENT DOCUMENTS

| | | | | |
|---|---|---|---|---|
| 3,874,116 A | * | 4/1975 | White | ........................... 48/209 |
| 4,118,204 A | * | 10/1978 | Eakman et al. | ........... 48/197 R |
| 4,274,839 A | * | 6/1981 | Leas | ........................... 48/202 |
| 4,773,226 A | * | 9/1988 | West | ........................... 60/670 |
| 5,059,404 A | | 10/1991 | Mansour et al. | |
| 5,133,297 A | | 7/1992 | Mansour | |
| 5,197,399 A | | 3/1993 | Mansour | |
| 5,205,728 A | | 4/1993 | Mansour | |
| 5,211,704 A | | 5/1993 | Mansour | |
| 5,255,634 A | | 10/1993 | Mansour | |
| 5,306,481 A | | 4/1994 | Mansour et al. | |
| 5,353,721 A | | 10/1994 | Mansour et al. | |
| 5,366,371 A | | 11/1994 | Mansour et al. | |
| 5,536,488 A | | 7/1996 | Mansour et al. | |
| 5,637,192 A | | 6/1997 | Mansour et al. | |
| 5,638,609 A | | 6/1997 | Chandran et al. | |
| 5,842,289 A | | 12/1998 | Chandran et al. | |
| 6,149,765 A | | 11/2000 | Mansour et al. | |
| 6,548,197 B1 | * | 4/2003 | Chandran et al. | ............. 429/17 |
| 6,688,106 B2 | * | 2/2004 | Okusawa et al. | ............. 60/653 |

* cited by examiner

*Primary Examiner*—Kenneth Rinehart
(74) *Attorney, Agent, or Firm*—Dority & Manning, P.A.

(57) ABSTRACT

A gasifier system and process comprises a pulse combustion device in communication with a fluid channel for producing a gas stream having heat or fuel value. The pulse combustion device is operated under sub-stoichiometric conditions such that combustion and steam reforming both occur in the fluid channel. The pulse combustion device also produces a pulsating combustion product stream and an acoustic pressure wave. The acoustic pressure wave serves to cause agglomeration of particles contained within the combustion stream for easy removal. In one embodiment, a sulfur capturing agent is injected into the fluid channel for not only removing sulfur from the combustion product stream but for also facilitating particle agglomeration. Ultimately, a gas stream containing hydrogen is produced that may be used in various processes, such as in the production of electricity.

29 Claims, 8 Drawing Sheets

Process Block Diagram of Gasifier Island

Figure 1. Process Block Diagram of Gasifier Island

Figure 5: Equilibration Sulfur Capture Under Reducing Conditions

Figure 6: Thermodynamic Sulfur Retention Equilibria of Calcium- Based Sorbents at Atmospheric Conditions

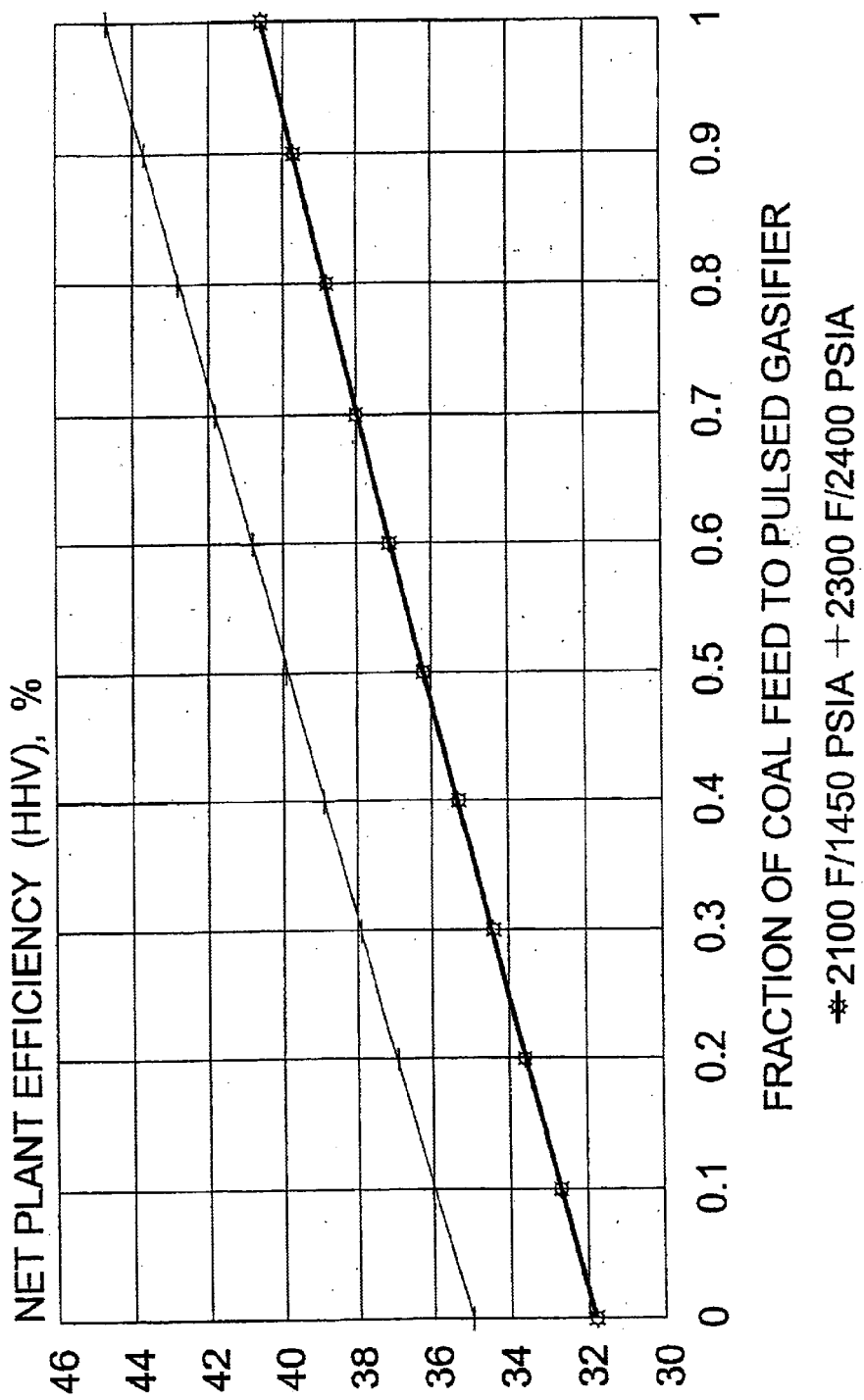

PULSE GASIFICATION AND HOT GAS CLEANUP APPARATUS AND PROCESS

RELATED APPLICATIONS

The present application claims priority to and is based upon a provisional patent application having Application Ser. No. 60/382,302 filed on May 22, 2002.

BACKGROUND OF THE INVENTION

A major concern with the utilization of certain fuels in directly fired conventional power generation systems and other processes is the particulates produced by combustion of the fuels. These particulates remain in the combustion gas stream. Because the gas stream running such systems can adversely impact on the life of the equipment, the gas stream should be substantially free of the particulate matter. Although conventional particulate removal devices may be used to remove some of the larger solid particulate matter from combustion gas streams, these devices generally fail to remove the smaller particulates from the streams. Similar problems also exist in many gas streams in which the particulate suspended matter originates from other than combustion.

U.S. Pat. No. 5,353,721 to Mansour, et al. and U.S. Pat. No. 5,197,399 to Mansour, et al., which are incorporated herein in their entirety by reference thereto for all purposes, describe a pulsed combustion apparatus and process for acoustically agglomerating particulates produced by the combustion of fuels so that the particulates may be removed from the combustion effluent stream. Once the particles are removed from the combustion effluent stream, the stream can then be used in various processes and systems. For example, in one embodiment, the effluent stream can be used to rotate a turbine for producing electricity.

Tests conducted in this mode in a process development unit (PDU) with pulverized bituminous coal and four different sorbents for sulfur capture provided the following results: (1) the combustion efficiency exceeded 99 percent; (2) sulfur capture was as high as 98 percent; (3) $NO_x$ emissions were in the range of 0.3 to 0.6 lb/MMBtu; and (4) the solids loading in cyclone exit flue gas (analogous to turbine inlet solids loading) was as low as 23 ppmw. The solids loading result greatly surpassed the original target goal of 100 to 150 ppmw and was good enough to meet the New Source Performance Standards (NSPS) for particulate emissions from power plants (<0.03 lb/MMBtu).

However, while the operation in the combustion or fuel lean mode provided satisfactory and encouraging results, the process was constrained thermodynamically and presented various problems related to emissions control. Specifically, the following limitations became apparent:

Sulfur retention or calcium utilization decreases with an increase in operating temperature under oxidizing or fuel lean conditions. For example, the Ca/S molar feed ratio required for 95% sulfur capture is very favorable at temperatures up to about 1,000° C. (1,832° F.) but rises sharply with further increase in temperature. This constrains the gas turbine inlet temperature and in turn the cycle or plant efficiency.

Although pulse combustors are inherently low $NO_x$ devices, oxidizing mode of operation, presence of fuel bound nitrogen and high temperature all favor $NO_x$ formation. Therefore, further $NO_x$ reduction, especially in the context of rising gas turbine inlet temperature requirement, was needed.

Higher temperatures (>1,000° C. or 1,832° F. ) in the agglomeration chamber favor acoustic agglomeration, but not sulfur capture. This tends to limit the extent of decrease in the solids loading in cyclone exit flue gas.

As such, a need currently exists for an improved agglomeration apparatus and process.

SUMMARY OF THE INVENTION

In accordance with one embodiment of the present invention, an apparatus and process for gasification of feedstocks (e.g., coal, coke, other solid fuels, heavy liquid hydrocarbons, slurries, and the like) with in-situ hot gas clean-up to generate clean, medium Btu gas is disclosed. In one particular embodiment, the process employs a pulsed gasification device that incorporates one or two stages of gasification. The process promotes acoustic agglomeration of particulates to aid in particulate collection using conventional separation apparatus, and facilitates the use of appropriate sorbents to capture gaseous pollutants in a sonic-enhanced environment. The apparatus may be employed in a variety of different configurations, such as combined cycle configurations with varying combinations of fuel cell, gas turbine and steam turbine for power generation, as well as in cogeneration configurations for combined heat and power production, for hydrogen production, for liquid fuels production, or for direct reduction of iron.

In one embodiment, for instance, the gasifier system includes a pulse combustion device for first-stage gasification, a U-tube arrangement for slag removal, a vertical entrained flow section for second-stage gasification, and primary and secondary cyclones for particulate capture. Oxygen and steam can be used as gasification agents to enhance the product gas heating value and, in turn, promote flame stability and turndown partial oxidation. For instance, partial oxidation can occur in the first stage while predominantly steam reforming processes can occur in the second stage.

In the second stage, sorbent particles are injected into a gas stream subjected to an intense acoustic field. The acoustic field serves to improve sorbent calcination by enhancing both gas film and intra-particle mass transfer rates. In addition, the sorbent particles act as dynamic filter foci, providing a high density of stagnant agglomerating centers for trapping finer entrained flyash fractions. A regenerate sorbent can be used for in-situ sulfur capture and a sulfur recovery unit may be included to generate a sulfur byproduct. The byproduct can be, for instance, ammonium sulfate or elemental sulfur or sulfuric acid.

In one particular embodiment, the system of the present invention is for producing a gas stream having fuel or heat value. The system can include a fluid channel including a first stage section and a second stage section. The fluid channel may include a U-shaped section that transitions the first stage section to the second stage section. A pulse combustion device comprising a pulse combustor coupled to at least one resonance tube, may be placed in communication with the first stage section of the fluid channel. The pulse combustion device may be configured to combust a solid or liquid fuel and create a pulsating combustion stream and an acoustic pressure wave. The fluid channel can be shaped to transmit the acoustic pressure wave from the first stage section to the second stage section.

The system may further include a sulfur capturing agent injection port for injecting a sulfur capturing agent into the second stage section of the fluid channel. The sulfur capturing agent is configured to remove sulfur-containing gases from the pulsating combustion stream and to undergo acoustic agglomeration with any particles contained in the pulsating combustion stream. A particulate removal device, such as a low velocity cyclone in combination with a high velocity cyclone, may receive the combustion stream from the fluid channel. The particulate removal device may be used for removing particulates from the stream. Once the particulates are removed from the stream, the stream may be used in various processes. For example, in one embodiment, the stream may be used to power a gas or steam turbine or may be used to power a fuel cell.

In addition to systems for producing gases, the present invention is also directed to various processes for producing a gas stream having fuel or heat value. In one embodiment, for instance, the process can include the step of combusting a solid or liquid fuel in a pulse combustion device and creating a pulsating combustion stream and an acoustic pressure wave. The pulse combustion device may be operated at sub-stoichiometric conditions. As used herein, sub-stoichiometric conditions refer to combustion conditions in which oxygen is not present in amounts sufficient to completely combust a fuel source. In the present invention, for instance, the pulse combustion device may operate at stoichiometry levels of from about 30% to about 60%. Further, the solid or liquid fuel may be fed to the pulse combustion device in conjunction not only with an oxygen source but also with steam. The steam may be used to control stoichiometry levels, to control temperatures, and to allow for steam reforming.

Once formed, the pulsating combustion stream and the acoustic pressure wave may be directed through a fluid channel. At least one portion of the fluid channel may operate under reducing conditions in order to promote steam gasification. During steam gasification, endothermic reactions occur in which hydrocarbon compounds are broken down and hydrogen is formed. Hydrogen and lower molecular weight hydrocarbon gases are valuable energy sources.

According to the process of the present invention, a sulfur capturing agent may be injected into the fluid channel. The sulfur capturing agent can capture sulfur contained in the pulsating combustion stream. The sulfur capturing agent also acoustically agglomerates with particles contained in the pulsating combustion stream.

From the fluid channel, the combustion stream containing hydrogen and agglomerated particles may then be filtered using any suitable particulate removal device. For example, in one embodiment, dual cyclones may be used to remove the agglomerated particles. The resulting product gas stream may then be used as desired in various processes.

In one embodiment, the agglomerated particles that are removed from the combustion stream may be fed to a heated fluidized bed. The fluidizing medium in the bed may contain oxygen causing exothermic reactions to occur in the bed. For example, in one embodiment, sulfide contained in the agglomerated particles may be converted into a sulfate. In an alternative embodiment, when the sulfur capturing agent is cerium oxide, the agglomerated particles may be placed in the fluidized bed in order to regenerate the cerium oxide and generate sulfur dioxide. The gas stream being created within the fluidized bed may then be treated in order to remove the sulfur dioxide.

In one embodiment, the fluid channel can include a first stage section and a second stage section. The first stage section may be maintained at a temperature of less than about 4000° F. and can include a first exit temperature. The second stage section, on the other hand, can include a second exit temperature. The second exit temperature may be less than the first exit temperature and may be no greater than about 1900° F., such as less than about 1700° F.

Conditions within the first stage section of the fluid channel may be maintained so as to allow for partial oxidation, steam gasification, and slag formation. When slag is formed, the slag may be periodically removed from the fluid channel.

In the second stage section of the fluid channel, however, reducing conditions may exist for promoting steam gasification (also referred to as steam reforming) which promotes the production of hydrogen and other lower molecular weight hydrocarbons.

Other features and aspects of the present invention are described in more detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which:

FIG. 8 is a graphical depiction of the relationship between net plant efficiency and the fraction of coal feed to a pulsed gasifier in accordance with one embodiment of the present invention.

Figure 1:
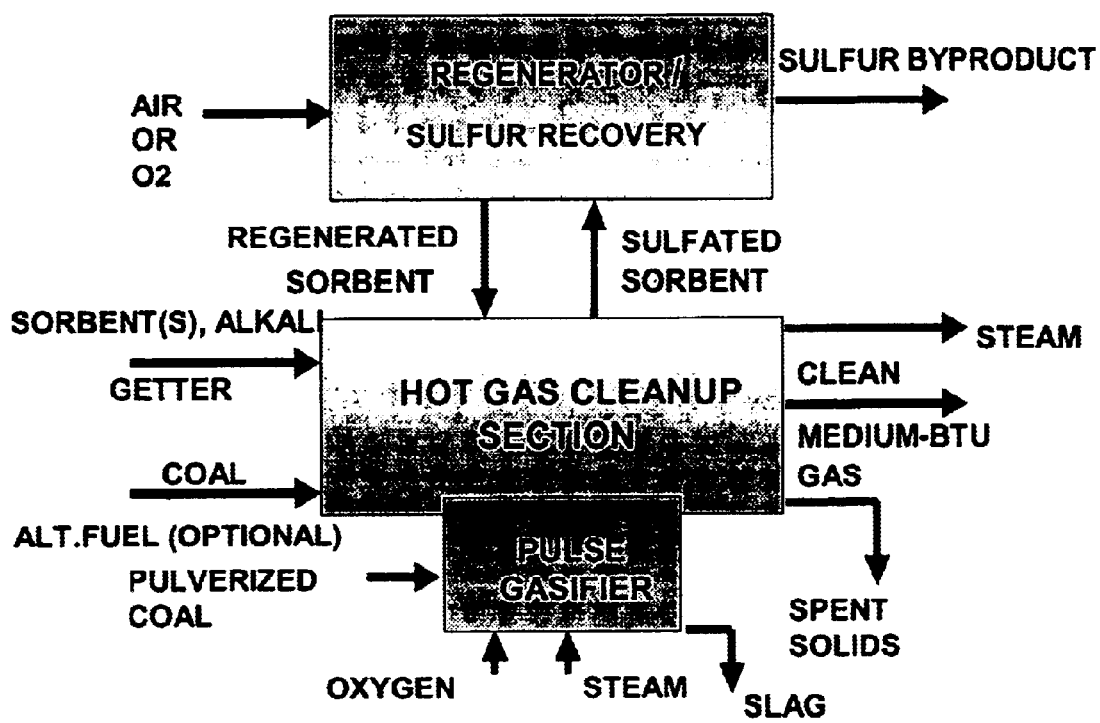
FIG. 1 is an exemplary block flow diagram of one embodiment of the pulse gasification system of the present invention.

Repeat use of reference characters in the present specification and drawings is intended to represent same or analogous features or elements of the invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention, which broader aspects are embodied in the exemplary construction.

The present invention is generally directed to an innovative pulse gasification system that overcomes many of the limitations of prior pulse gasification systems and may be configured to comply with stipulated new emissions target of one-tenth of NSPS. For example, in one embodiment, the system and process of the present invention can be configured to emit less than about 0.12 lb/MMBTU of sulfur dioxide, less than about 0.06 lb/MMBTU of nitrous oxides (NO$_x$), and/or less than about 0.003 lb/MMBTU of particulates.

In one embodiment, the pulse gasifier system includes a pulse unit for first-stage gasification, a U-tube arrangement for slag removal, and may also include a vertical entrained flow section for second-stage gasification and primary and secondary cyclones for particulate capture. The feedstock can be coal, coke, biomass, heavy liquid hydrocarbon, etc., and can be in the form of solids, heavy liquids, slurries, etc. Oxygen and steam may be used as gasification agents to enhance product gas heating value, as well as to promote flame stability and turndown. In the case of a combined cycle configuration, this also helps boost the gas turbine inlet temperature and plant efficiency. Air may be used as a gasification agent, although it may, in some instances, lower the heating value of the gas produced due to the diluent nitrogen. Compressed air may be used to pneumatically convey the solid fuels from the metering bin to the pulse gasifier. Superheated steam may also be used as transport/carrier fluid. Superheated steam is the preferred carrier for dry solid feedstock in some embodiments.

The pulse gasifier incorporates one or two gasification stages to facilitate good carbon conversion, high sound pressure level for acoustic agglomeration, and good in-situ sulfur capture. In the two-stage case, the first stage can operate in the slagging mode and under sub-stoichiometric conditions. In the presence of oxygen and steam, feedstock devolatilizes and partially oxidizes to release heat for the steam/feedstock gasification reactions to proceed. The high operating temperature (e.g., 2,500° F. –3,400° F.) can ensure high carbon version and aid ash melting and slag flow.

In conventional slagging gasifiers, the slag region corresponds to an active zone with gas-solids mixing, combustion, and slag tapping, all occurring above the hearth plate. The design and the ability to keep the slag tapping process functioning are sometimes important. The art is to retain the solids within the gasifier and yet allow the liquid slag to drain through the tap hole at the desired rate. In the pulse gasifier of the present invention, the slag region can correspond to an active and a passive zone. In the active zone, partial oxidation, steam gasification, and slag formation can take place, while the slag is tapped from the passive zone. Consequently, the slag removal process/hardware design is comparatively simple, with essentially the only requirement that the slag tap hole not be allowed to freeze shut.

In the two-stage configuration, a U-tube coupling arrangement can be provided between the first and second stages to ensure that molten slag can be collected efficiently and withdrawn from a port at the base of the U-tube. Slag is anticipated to predominantly flow along the bottom side of the first half of the U-bend into the slag tap hole and then into a slag quench bath. In addition, this configuration forces the exit jets from the tailpipes to impinge on the concave sections and spin around. This enhances the mixing within the chamber, as well as the residence time of the carbon to optimize the carbon conversion efficiency. The second stage may or may not be employed. This will depend on the temperature of operation of the first stage as dictated by the reactivity of the feedstock and the slag temperature of the ash (e.g., biomass and lignite are not refractory and have lower ash slagging temperature). In other embodiments, the feed stock chosen may not produce slag or the system may be configured in order to prevent the formation of slag.

In the case of a two-stage system, the second stage can include a vertical refractory-lined section in which additional feedstock is injected to react with the hot gases from the first stage to enhance the product gas heating value and to cool the product gas into the threshold for in-situ sulfur capture. An additional port can be provided directly below the riser in the second-stage to catch any sorbent-ash agglomerates that fall down. Oxygen and steam may be used to fluidize the media in the agglomerate catch section. For example, oxygen can be employed to enhance char conversion and steam can be used to regulate the temperature in the second-stage. In an alternative embodiment, only steam may be injected into the second stage in order to promote the endothermic reactions that occur during steam gasification.

Figure 5:
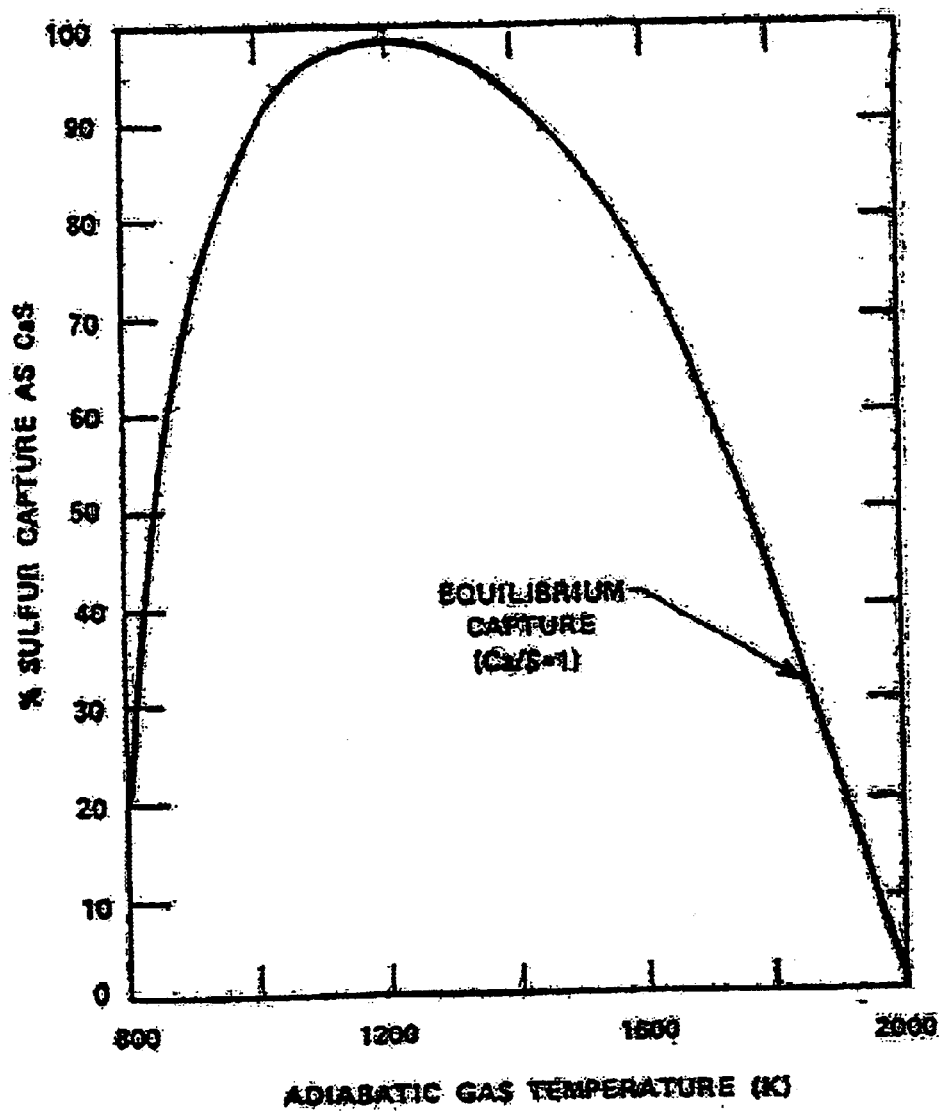
FIG. 5 is a graphical depiction of the relationship between % sulfur capture and adiabatic gas temperature under reducing conditions in accordance with one embodiment of the present invention.
Figure 6:
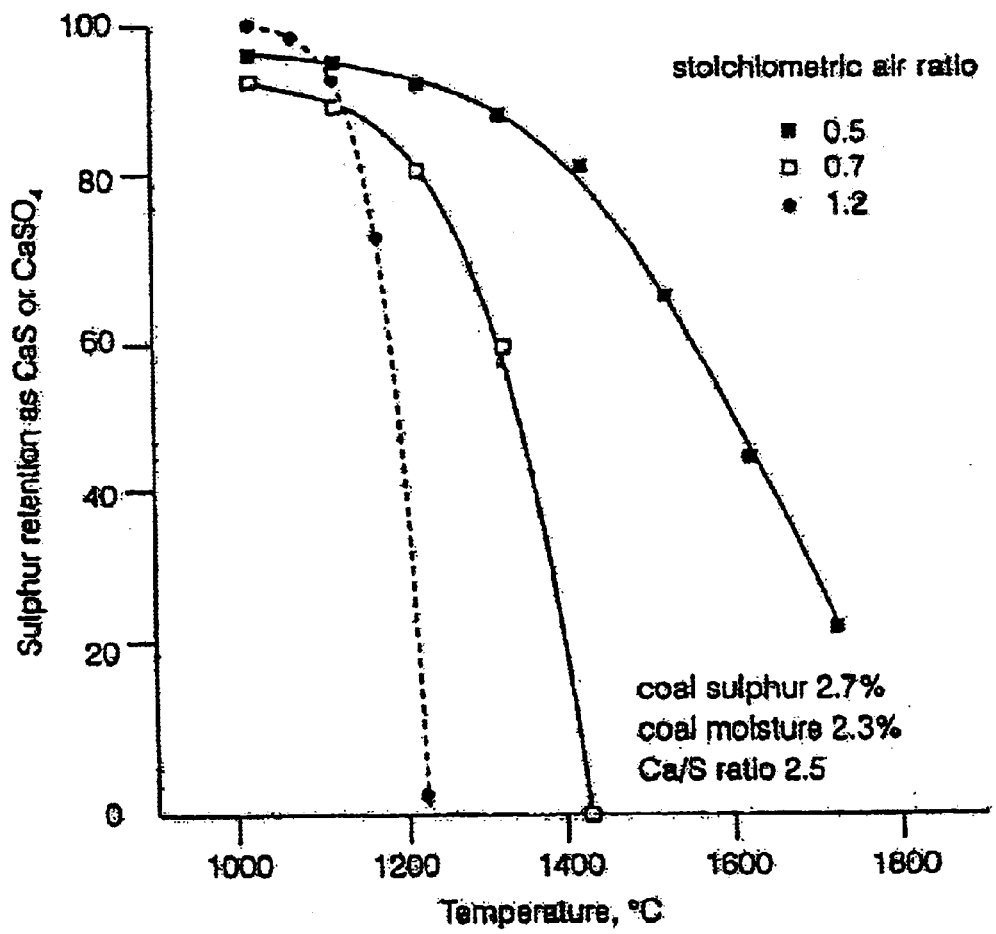
FIG. 6 is a graphical depiction of the relationship between sulfur retention (as CaS or $CaSO_4$) and temperature in accordance with one embodiment of the present invention.

The average gas temperature in the second stage can be from about 1000° F. to about 2500° F. Inspection of the temperature dependence of sulfur capture at equilibrium under reducing conditions, such as shown in FIGS. 5–6, indicates that this gas temperature is in the appropriate temperature window (e.g., from about 1,400° F. to about 2,400° F.) for sulfur capture efficiencies greater than 90 percent with calcium-based sorbents. Sulfur capture efficiency in a dynamic (non-equilibrium) situation depends on the temperature of the particle and not that of the gas.

With endothermic calcination, limestone or dolomite sorbent generally requires time to reach the gas temperature. The strategy sometimes adopted in the second stage is such that the sorbent will be injected near the base where the temperature is highest to assist calcination. If regenerable sorbents such as cerium oxide are used, the sorbent can be injected further downstream of the U-bend or in the middle area of the second stage. If desired, the residence time of the sorbent in the second stage can be controlled by optimizing the location of the sorbent injection port. Thus, in this embodiment, the sorbent particles flow into the middle section of the second stage (maintained at about 2,000° F.) well before thermodynamics impose constraints on sulfur capture. Such a strategy can ensure maximum sulfur capture for a specified sorbent particle residence time. If necessary, pulverized alkali gettering material, such as emathlite, hectorite or kaolinite, can also be injected into the second stage to aid alkali vapor capture.

Agglomeration of ash in the second stage can have a significant advantage. For example, in some instances, such agglomeration can facilitate the use of one or more conventional particulate capture devices, such as hot cyclones, to bring down the particulates in the gas stream to acceptable levels without recourse to the more expensive candle filtration or problematic slag screens. In such a case, the second stage effectively acts as a dynamic filter in which fly ash from the coal fines agglomerate with the larger sorbent particles due to collisions between the fine particles and the sorbent agglomeration foci.

Acoustic agglomeration is a pretreatment process that increases the average size of entrained particles, making it possible to obtain high collection efficiency using hot cyclones. It is often desirable to use two cyclones, wherein the primary cyclone is a low velocity cyclone to capture agglomerates with minimal breakup and the secondary cyclone is a high velocity, high efficiency cyclone to capture the fines. The relatively clean product gas from the secondary cyclone can be used for power generation or steam generation or as a process fuel or for hydrogen production or for direct reduction of iron or for liquid fuels production and other synthetic gas applications. The solids catch from the hot cyclones contains both spent sorbents as well as some unconverted carbon. The extent of the unconverted carbon can be controlled and typically depends on the process objectives and performance requirements.

In one embodiment, sorbent particles are injected into a gas stream subjected to an intense acoustic field within the second stage. The acoustic field serves to improve sulfur capture efficiency by enhancing both gas film and intra-particle mass transfer rates. In addition, the sorbent particles act as dynamic filter foci, providing a high density of stagnant agglomerating centers for trapping the finer entrained (in the oscillating flow field) fly ash fractions. The fly ash fractions have particle sizes that are generally about 20 microns or less, and in some embodiments, from about 1 to about 20 microns. Therefore, by introducing sorbent particles, which are primarily concentrated in the size range from 20 to 150 microns, a bimodal distribution is created. The bimodal distribution offers several advantages. First, by increasing the density (in the gas) of large stagnant trap centers, an accelerated agglomeration rate can be achieved. Second, agglomeration can be efficiently performed at a significantly lower acoustic frequency range compared to unimodal distributions containing only finer fly ash fractions.

The effectiveness of particle agglomeration at low frequencies can be important in some instances. The rate of agglomeration is strongly influenced by the acoustic intensity level. Because low frequencies are generally attenuated less than high frequencies, lower frequency operation are often more effective. Furthermore, low frequencies do not affect the performance of turbine blades, while frequencies in the kHz range may couple into the system's natural frequencies and cause blade fatigue failure. Finally, the cut-off particle diameter for 50 percent entrainment increases with a decrease in frequency and therefore lower frequency operation results in the entrainment of a larger proportion of a given particle feed size distribution and places less constraint on the upper limit for particle growth.

It is believed that some chemical reactions in the high temperature (e.g., 1800° F. –3400° F.) first stage are as follows:

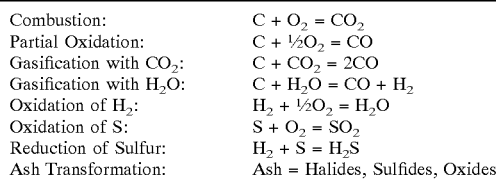

| Combustion: | $C + O_2 = CO_2$ |
| Partial Oxidation: | $C + \frac{1}{2}O_2 = CO$ |
| Gasification with $CO_2$: | $C + CO_2 = 2CO$ |
| Gasification with $H_2O$: | $C + H_2O = CO + H_2$ |
| Oxidation of $H_2$: | $H_2 + \frac{1}{2}O_2 = H_2O$ |
| Oxidation of S: | $S + O_2 = SO_2$ |
| Reduction of Sulfur: | $H_2 + S = H_2S$ |
| Ash Transformation: | Ash = Halides, Sulfides, Oxides |

The hot fuel gas exiting the first stage can react with the fuel injected into the second-stage entrance (when desired) for a two-stage configuration. Here, the additional fuel devolitilizes and gasifies. Further downstream, the sorbent injected calcines, if applicable, and undergoes sulfidation. The temperature in the second stage decreases from the inlet (about 2,500° F.) to the exit (about 1,700° F.). It is believed that some chemical reactions in this zone are as follows:

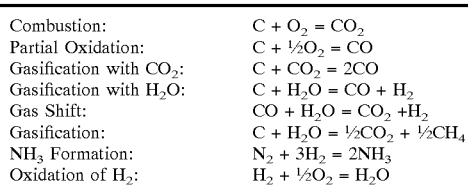

| Combustion: | $C + O_2 = CO_2$ |
| Partial Oxidation: | $C + \frac{1}{2}O_2 = CO$ |
| Gasification with $CO_2$: | $C + CO_2 = 2CO$ |
| Gasification with $H_2O$: | $C + H_2O = CO + H_2$ |
| Gas Shift: | $CO + H_2O = CO_2 + H_2$ |
| Gasification: | $C + H_2O = \frac{1}{2}CO_2 + \frac{1}{2}CH_4$ |
| $NH_3$ Formation: | $N_2 + 3H_2 = 2NH_3$ |
| Oxidation of $H_2$: | $H_2 + \frac{1}{2}O_2 = H_2O$ |

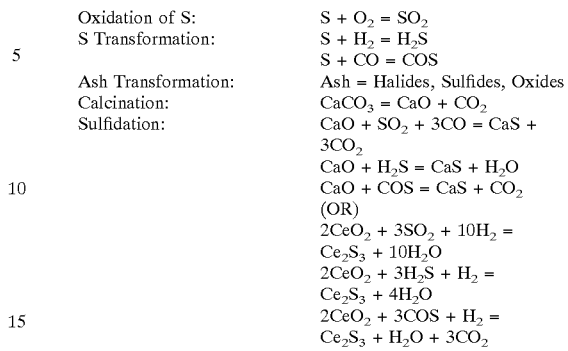

| -continued | |
|---|---|
| Oxidation of S: | $S + O_2 = SO_2$ |
| S Transformation: | $S + H_2 = H_2S$ |
| | $S + CO = COS$ |
| Ash Transformation: | Ash = Halides, Sulfides, Oxides |
| Calcination: | $CaCO_3 = CaO + CO_2$ |
| Sulfidation: | $CaO + SO_2 + 3CO = CaS + 3CO_2$ |
| | $CaO + H_2S = CaS + H_2O$ |
| | $CaO + COS = CaS + CO_2$ |
| | (OR) |
| | $2CeO_2 + 3SO_2 + 10H_2 = Ce_2S_3 + 10H_2O$ |
| | $2CeO_2 + 3H_2S + H_2 = Ce_2S_3 + 4H_2O$ |
| | $2CeO_2 + 3COS + H_2 = Ce_2S_3 + H_2O + 3CO_2$ |

If the fuel contains more than a trace of (~10 ppm) of halogens (Cl, F, Br, I), then the acid gases (HCl, HF, etc.) sometimes formed from the halogens and the ash halides (NaCl, KCl, etc.) can be captured as well to generate a clean fuel gas. The temperature window for effective capture of these species, however, is often lower and can range from about 1,000° F. to about 1,400° F. Sodium-based absorbents (shortite, nahcolite, etc.) are preferred for acid gas (HCl, HF, etc.) uptake and alkali getters (kaolinite, emathlite, diatomaceous earth, bauxite, etc.) are preferred for alkali (NaCl, KCl, etc.) capture through a combination of physical adsorption and chemical reactions. The corresponding reactions are given below:

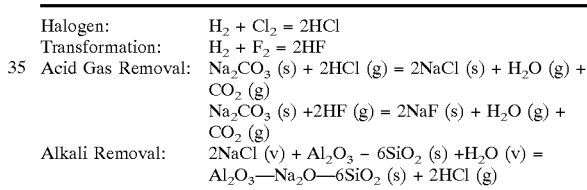

| Halogen: | $H_2 + Cl_2 = 2HCl$ |
| Transformation: | $H_2 + F_2 = 2HF$ |
| Acid Gas Removal: | $Na_2CO_3 (s) + 2HCl (g) = 2NaCl (s) + H_2O (g) + CO_2 (g)$ |
| | $Na_2CO_3 (s) + 2HF (g) = 2NaF (s) + H_2O (g) + CO_2 (g)$ |
| Alkali Removal: | $2NaCl (v) + Al_2O_3 - 6SiO_2 (s) + H_2O (v) = Al_2O_3 - Na_2O - 6SiO_2 (s) + 2HCl (g)$ | wherein, the letters in parenthesis ( ) denote the phase of the substance, i.e., the letter "s" denotes solid; "g", gas; and "v", vapor.

As stated above, the fuel gas is generally cooled to a temperature of about 1,200° F. to remove acid gas and alkali vapor. If halogens are present in the feed, the second-stage exit temperature can be lower (e.g., about 1,200° F.) than when halogens are absent (e.g., from about 1,700° F. to about 1,9000° F.). This can be accomplished using fuel gas cooling that may be carried out by external or internal means. A water jacket around part of the second-stage column upstream of the exit could, for example, provide external cooling. Since the medium to be cooled is primarily a gas or a gas-solid mixture, the heat-transfer surface area required for fuel gas cooling is typically rather large, which may give rise to an even taller second stage. Also, the corrosive nature of the fuel gas may require careful heat exchanger material selection, which may add to the cost of the unit. Thus, in some embodiments, water can be directly sprayed into the fuel gas through an atomizer spray head to perform the cooling. Due to the sensible and latent heat contribution, the water mass addition is generally small relative to the fuel gas mass. For instance, the water injection rate typically does not exceed about 5% of the fuel gas flow rate, on a mass basis. This is slightly lower the heating value of the fuel gas generated. Alternately, the fuel gas may be cooled downstream of the cyclones and passed through a bed of sorbent particles to remove acid gases, a sulfur polisher to further reduce sulfur content and a hot gas barrier filter to remove any entrained particulate matter.

Typically, between 50 to 100% of the fuel undergoes the first-stage gasification and the remainder (0–50%) may be injected at the entrance to the second-stage. The actual fuel split between the first-stage and the second-stage will depend upon the application, fuel properties and the unit size. Stoichiometry will also depend upon the application, fuel properties and the unit size. For instance, the first-stage stoichiometry can span the range between 30 to 60 percent and the overall stoichiometry can be within the bounds of 25 and 50 percent.

Computer simulations indicate that the clean fuel gas generated in the pulse gasifier should have a heating value on the order of 275 Btu/scf on a wet basis, if the fuel does not have halogens. If the fuel has halogens, the heating value will be lower and range between 250 and 275 Btu/scf depending on the concentration of halogens in the fuel.

If desired, the pulse gasifier may be employed in combined cycle configurations with varying combinations of fuel cell, gas turbine and steam turbine for power generation or in cogeneration configurations for combined heat and power production, for hydrogen production, for liquid fuels production, for direct reduction of iron, or other synthetic gas applications. One embodiment for power generation is described below. Other embodiments can be formulated for different applications by integrating the pulse gasifier with components such as fuel cell, gas turbine, pressure swing absorbers for $H_2$ production, liquefaction reactors for liquid fuels production, etc.

Referring to FIG. 1, a block diagram illustrating one embodiment of a process according to the present invention is shown. It should be understood, however, that FIG. 1 is only provided for exemplary purposes and is not intended as limiting the invention in any manner.

Figure 7:
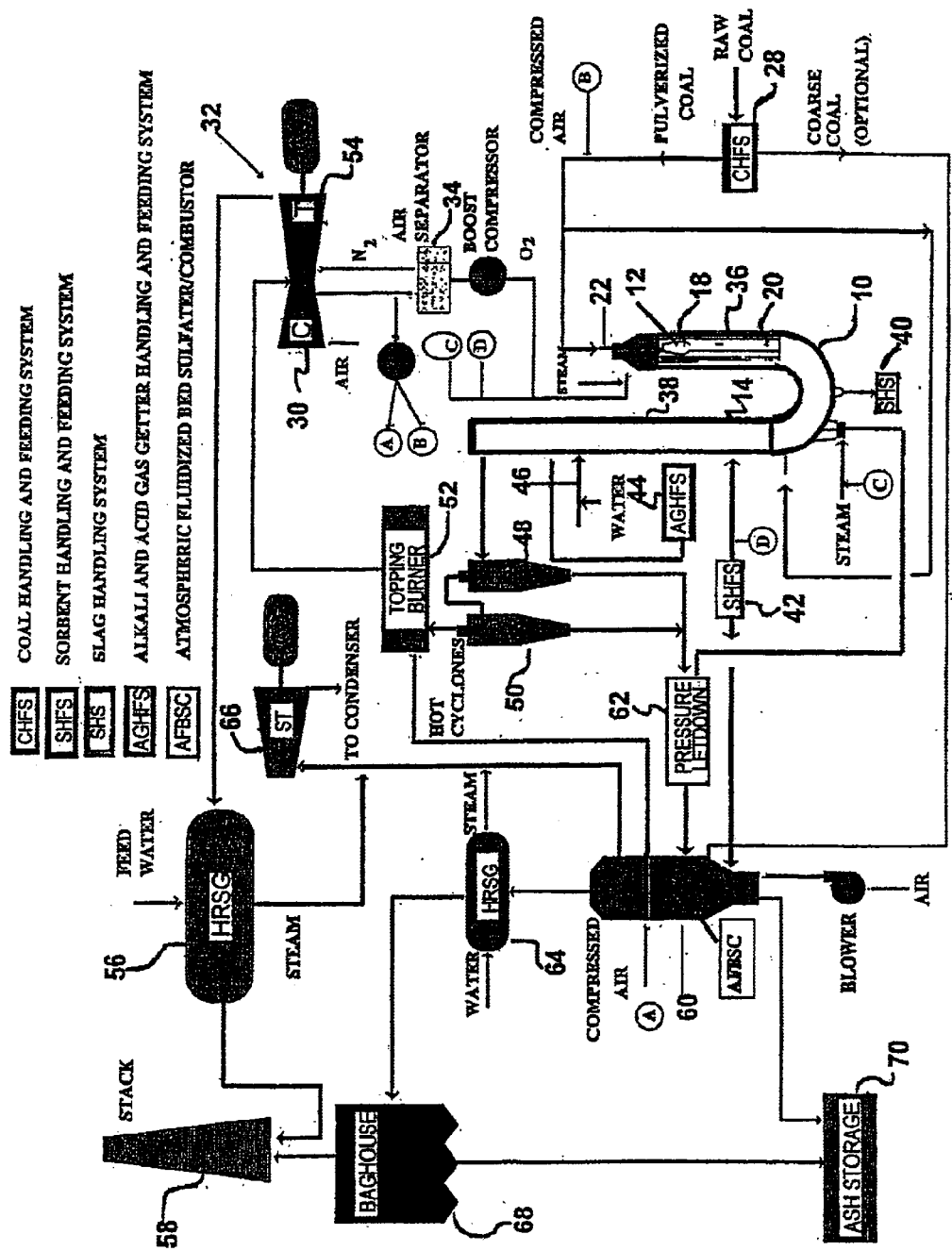
FIG. 7 is a schematic diagram of one embodiment of a pulsed gasifier combined cycle for coal in accordance with the present invention.

Referring now to FIG. 7, one embodiment of a more detailed system made in accordance with the present invention is shown. In particular, FIG. 7 depicts one embodiment of a pulsed gasification combined cycle made in accordance with the present invention.

As shown, the pulsed gasification combined cycle ("PGCC") includes the following:

Coal-Handling and Feeding System (CHFS);
Sorbent-Handling and Feeding System (SHFS);
Alkali and Acid Gas Getter Handling and Feeding System (AGHFS);
Pulse Gasifier, Hot Cyclones and Topping Burner;
Gas Turbine Generator Set;
Atmospheric Fluidized Bed Sulfater/Combustor (AFBSC);
Heat-Recovery Steam Generator (HRSG);
Steam Turbine Generator Set and Steam Cycle Components;
Baghouse;
Ash, Spent Sorbent and Slag handling and storage system; and
Air Separation Plant.

The detailed description of the system and process illustrated in FIG. 7 will now be described. It should be understood that FIG. 7 is being provided for exemplary purposes only and is not intended as limiting any of the features and aspects of the present invention. For example, none of the streams depicted in FIG. 7 should be interpreted as being necessary or critical to the present invention. Further, many of the features and aspects illustrated and described in FIG. 7 may be used in other alternative embodiments of the present invention.

In the embodiment shown in FIG. 7, the combined cycle has an open gas cycle and a closed steam cycle. This embodiment generates a fuel gas of heating value comparable to that in oxygen-blown IGCC. This embodiment is flexible enough for adaptation to both Greenfield and retrofit applications.

Figure 2:
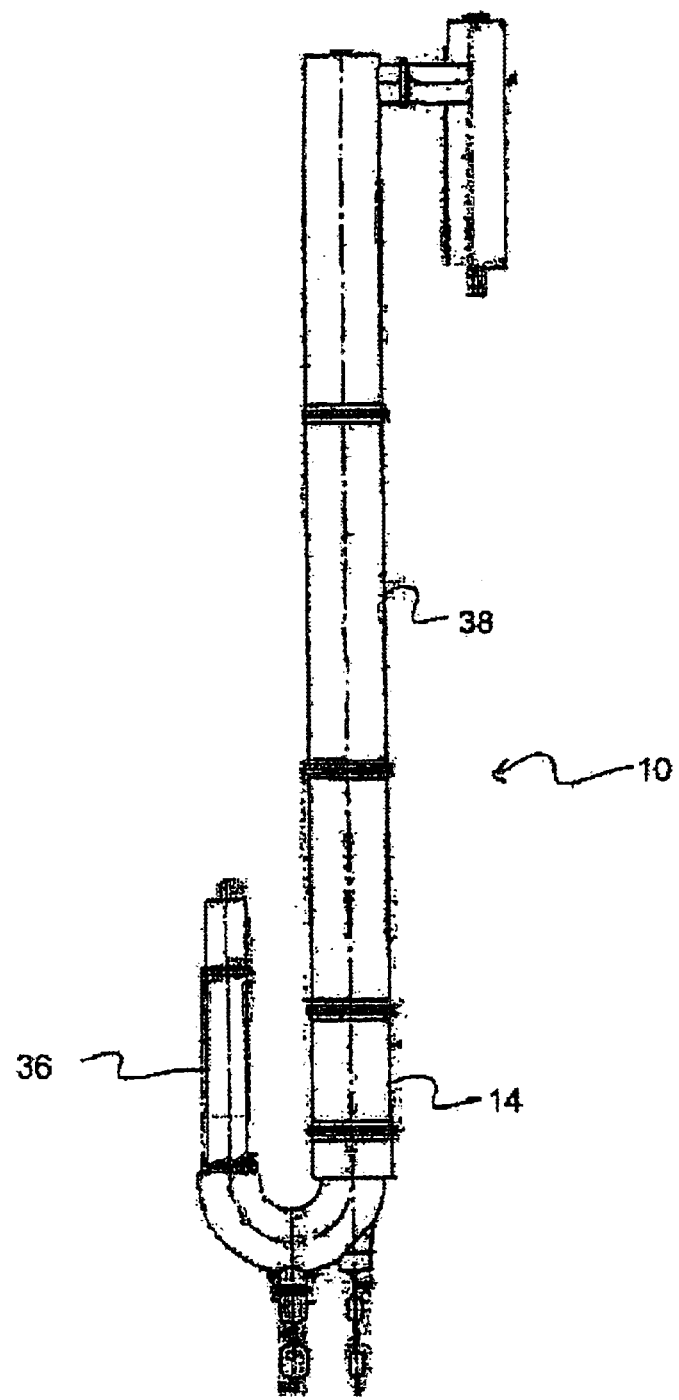
FIG. 2 shows an elevation view of one embodiment of the pulse gasifier of the present invention.
Figure 3:
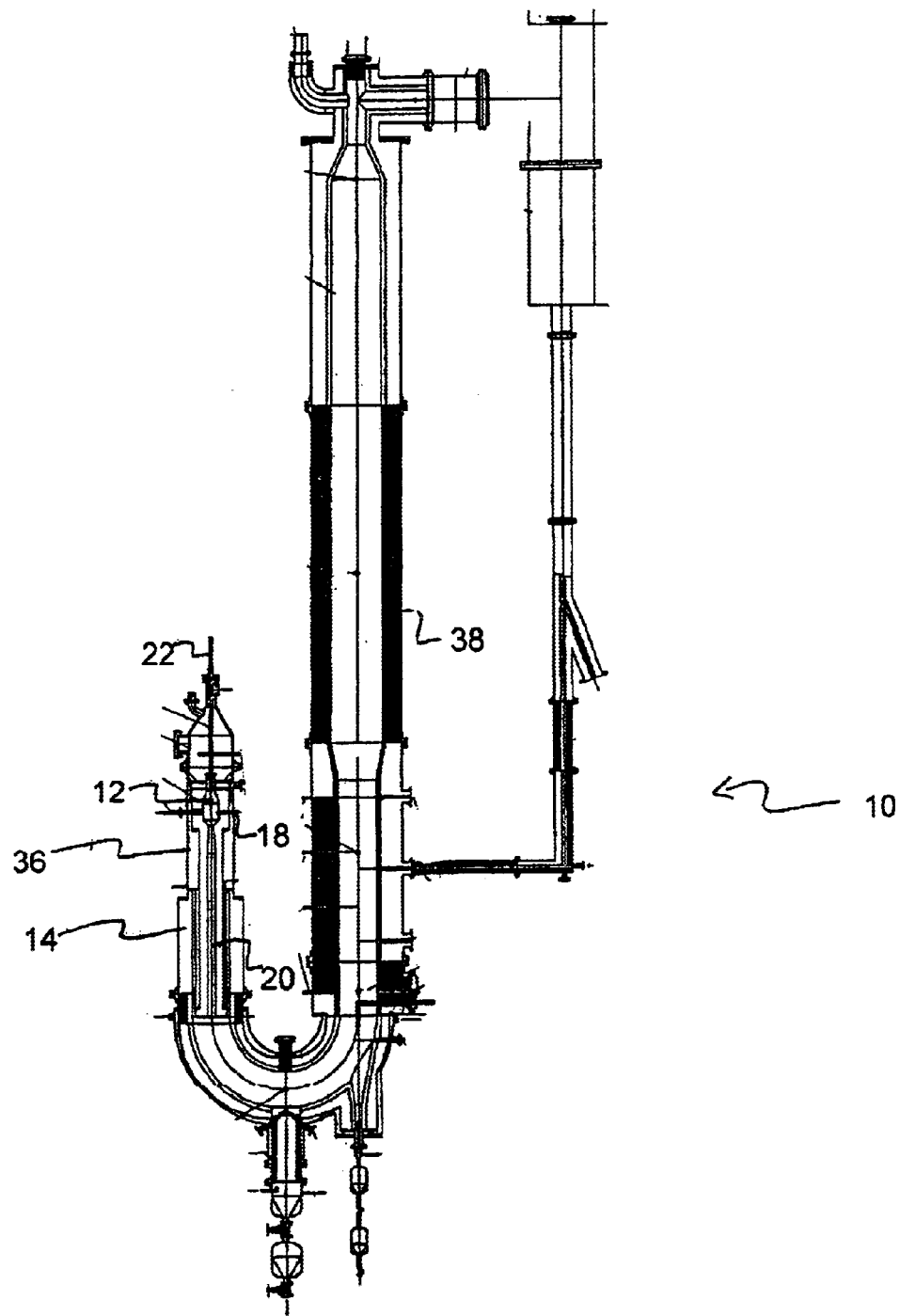
FIG. 3 is a cut out view of one embodiment of the pulse gasifier of the present invention.
Figure 4:
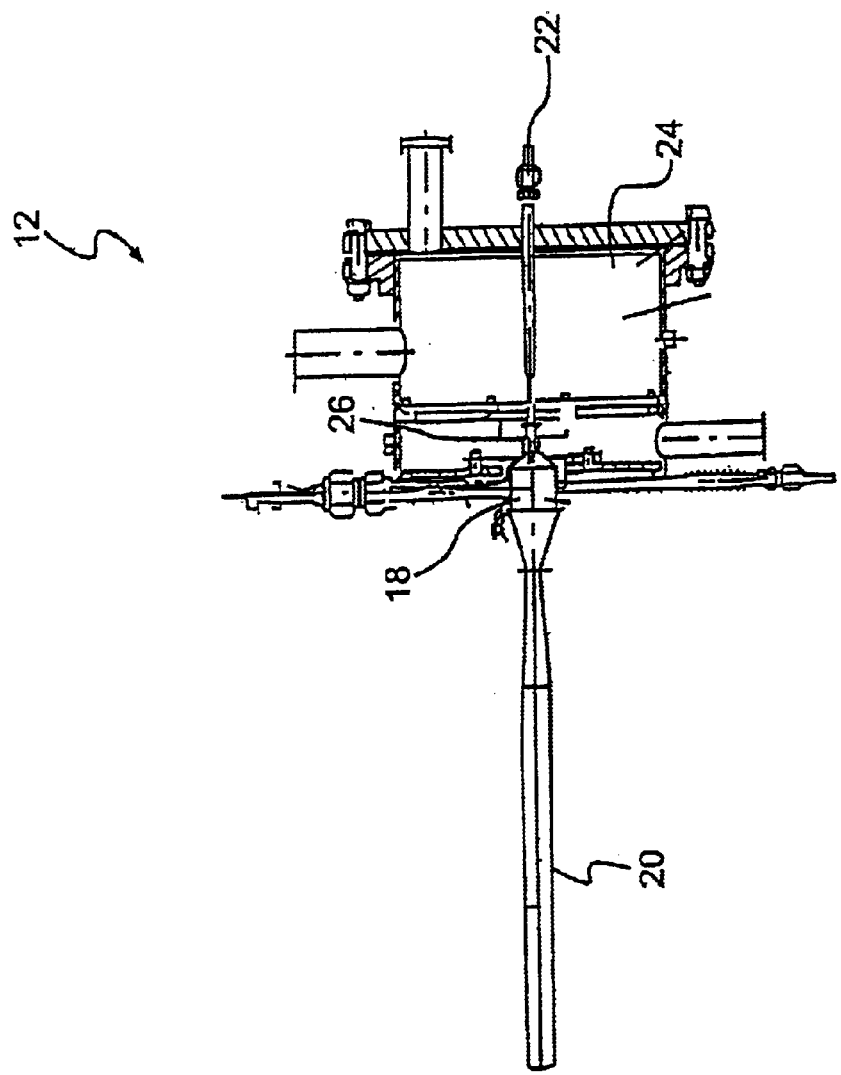
FIG. 4 is a cross sectional view of one embodiment of a pulse combustion device that may be used in the system and process of the present invention.

As shown in FIG. 7, the system includes a pulse gasifier generally 10, embodiments of which are also shown in FIGS. 2 and 3. The pulse gasifier 10 includes a pulse combustion device 12 contained within a fluid channel 14. Referring to FIG. 4, one embodiment of the pulse combustion device 12 is shown. Pulse combustion device 12 includes a combustion chamber 18 in communication with a resonance tube 20. Combustion chamber 18 can be connected to a single resonance tube as shown or a plurality of parallel tubes having inlets in separate communication with the pulse combustion chamber. Fuel, an oxygen source, and/or steam are fed to the combustion chamber 18 via a fuel line 22 and an air plenum 24. Pulse combustion device 12 can burn either a gaseous, a liquid or a solid fuel. For most applications, a gaseous fuel, for instance, may be used to initiate startup. Once operating, a liquid or solid fuel may then be fed to the combustion chamber.

In order to regulate the amount of fuel and gases fed to the combustion chamber 18, the pulse combustion device 12 can include at least one valve 26. The valve 26 may be an aerodynamic valve, although a mechanical valve or the like may also be employed.

During operation of the pulse combustion device 12, an appropriate fuel, oxygen source and steam mixture passes through the valve 26 into the combustion chamber 18 and is detonated. During startup, an auxiliary firing device such as a spark plug or pilot burner may be provided. Explosion of the fuel mixture causes a sudden increase in volume and evolution of combustion products which pressurizes the combustion chamber. As the hot gas expands, preferential flow in the direction of resonance tube 20 is achieved with significant momentum. A vacuum is then created in the combustion chamber 18 due to the inertia of the gases within the resonance tube 20. Only a small fraction of exhaust gases are then permitted to return to the combustion chamber, with the balance of the gas exiting the resonance tube. Because the pressure of combustion chamber 18 is then below atmospheric pressure, further fuel and gases are drawn into the combustion chamber 18 and auto-ignition takes place. Again, valve 26 thereafter constrains reverse flow, and the cycle begins anew. Once the first cycle is initiated, operation is thereafter self-sustaining.

Pulse combustion device 12 produces a pulsating flow of combustion products and an acoustic pressure wave. In one embodiment, the pulse combustion device produces pressure oscillations or fluctuations in the range of from about 1 psi to about 40 psi and particularly from about 1 psi to about 25 psi peak to peak. These fluctuations are substantially sinusoidal. The pressure fluctuation levels are on the order of a sound pressure range or intensity of from about 150 dB to about 194 dB, or greater. The acoustic pressure wave can be at a frequency of from about 20 Hz to about 1500 Hz. For most applications, however, lower frequencies are preferred. For instance, the frequency can be from about 25 Hz to about 250 Hz.

Although any suitable carbonaceous fuel may be combusted in the pulse combustion device 12, in the embodiment illustrated in FIG. 7, coal is used as the fuel source. As shown, the system includes a coal handling and feeding system 28. The coal is pulverized, combined with a carrier gas and fed to the combustion device 12. The carrier gas may be compressed air as shown in FIG. 7. In this particular embodiment, the compressed air is obtained from a compressor 30 that is shown in association with a gas turbine generally 32.

In addition to coal, an oxygen source and/or steam are also fed to the pulse combustion device 12. In this embodiment, for instance, substantially pure oxygen is combined with steam and fed to the pulse combustion device 12. The oxygen is obtained from an air separator 34 that receives compressed air from the compressor 30.

For most applications, the pulse combustion device 12 is operated at sub-stoichiometric conditions. In particular, oxygen is fed to the pulse combustion device in amounts insufficient to completely combust the fuel source. For example, in one embodiment, oxygen can be fed to the combustion device in an amount of from about 30% to about 60% of stoichiometric levels on a mole basis.

As described above, oxygen may be fed to the pulse combustion device 12 in conjunction with steam. Steam can be added in amounts sufficient to moderate the temperature of the pulsating combustion products and to promote steam reforming within the fluid channel 14. For example, when steam is present, some of the fuel is reformed undergoing endothermic reactions. The endothermic reactions take heat away from the system and thereby moderate the temperature of the resulting pulsating combustion stream. In general, steam may be present in amounts sufficient to maintain the temperature of the combustion products at less than about 4000° F., such as less than about 3400° F. For example, in one embodiment, the temperature can be maintained between about 1800° F. to about 3400° F., such as from about 2500° F. to about 3400° F.

As shown, the fluid channel 14 has a U-shaped section. In some embodiments, the fluid channel 14 can be maintained as a single stage system. In other embodiments, however, the fluid channel may be divided into a first stage 36 containing the pulse combustion device 12 and a second stage 38 downstream. In general, when slag is formed during the process, a two-stage system may be desired. Slag may form, for instance, when using refractory feed stocks, such as petroleum coke or raw coal as shown in FIG. 7. When using coal as the feed stock, for instance, slag may form when temperatures rise above about 2000° F.

Thus, in one embodiment of the present invention, multiple processes may occur within the first stage 36 of the fluid channel 14. For instance, not only is a pulsating combustion stream and an acoustic pressure wave formed, but partial oxidation of the fuel source occurs in the first stage, steam gasification of the fuel source, and slag formation. Of particular advantage, since the fluid channel 14 has a U-shaped section, slag, once formed, is directed into a port and collected by a slag handling system 40. The U-shaped section also enhances mixing of the pulsating combustion stream that exits from the pulse combustion device 12.

In the second stage 38 of the fluid channel 14, the temperature of the pulsating combustion stream is generally lowered and various additives may be added to the stream. For most applications, reducing conditions are maintained within the second stage 38 in order to promote steam reforming and associated endothermic reactions.

In one optional embodiment, for instance, a portion of the pulverized coal from the coal handling and feeding system 28 may be injected into the second stage 38. Once injected into the second stage of the fluid channel, the fuel undergoes steam gasification. If necessary, further amounts of steam as shown in FIG. 7 may also be injected into the second stage 38 of the fluid channel 14. Minor amounts of oxygen may be present in the second stage. For most applications, however, oxidation should not be the primary driving force.

As shown in FIG. 7, a sulfur capturing agent is injected into the second stage 38 from a sorbent handling and feeding system 42. The sulfur capturing agent serves two purposes. First, the sulfur capturing agent removes sulfur from the pulsating combustion stream. Second, the sulfur capturing agent also facilitates agglomeration of flyash or other small particulates contained within the pulsating combustion stream.

The sulfur capturing agent, in one embodiment, may be limestone, dolomite, or mixtures thereof. These sulfur capturing agents capture sulfur through endothermic reactions. Thus, limestone and dolomite may need to be heated prior to the desirable reactions occurring. Consequently, these agents may be injected more towards the U-shaped section of the fluid channel.

In an alternative embodiment, however, cerium oxide may be used as a sulfur capturing agent. Cerium oxide may generally be added anywhere along the length of the second stage 38.

As described above, due to the presence of the acoustic pressure wave, the sulfur capturing agent agglomerates with particulates contained within the pulsating combustion stream. Some of the agglomerates will continue to travel with the pulsating combustion stream. Other portions of the agglomerates, however, may fall within the second stage 38. Not shown, a port may be provided directly below the riser in the second stage that serves to catch any such agglomerates.

When halogens are present in the pulsating combustion stream, in some embodiments, it may be necessary to also inject an alkali gettering agent into the second stage 38 of the fluid channel 14. For instance, an alkali gettering agent may be injected into the second stage via an alkali and acid gas getter handling and feeding system 44.

When removing halogens, lower temperatures may be required. In this regard, the system can also include a water port 46 configured to inject or spray water into the second stage 38 and cool the pulsating combustion stream.

The inlet temperature of the second stage 38 may vary from about 1800° F. to about 3000° F. Likewise, the exit temperature of the second stage may also vary. In some embodiments, for instance, the exit temperature may be less than about 1900° F., such as less than about 1700° F. When halogens are present, however, the exit temperature may be less than about 1400° F., such as from about 1000° F. to about 1200° F.

The pressure within the fluid channel 14 may vary depending upon the particular application. For example, the pressure within the fluid channel can be from about atmospheric pressure to about 20 times atmospheric pressure. In one embodiment, for instance, the pressure can be from about 10 times atmospheric pressure to about 20 times atmospheric pressure.

In general, the pulse gasifier 10 may convert between about 90% and about 96% of the carbon contained in the fuel source. The gas that is formed by the pulse gasifier may contain relatively large amounts of hydrogen in combination with other gases. The other gases may include, for instance, carbon dioxide, carbon monoxide, and lighter hydrocarbons.

The clean gas generated in the pulse gasifier has a heating value on the order of 250 Btu/scf on a wet basis. This value is comparable to that reported for gases generated in oxygen-blown IGCC, but exceeds the heating value of low-Btu gases generated in air-blown IGCC and second-generation PFBC.

As shown in FIG. 7, from the pulse gasifier 10, the product gas stream is then fed to a tandem pair of cyclones 48 and 50. Of particular advantage, due to the effective agglomeration that occurs within the pulse gasifier, low energy cyclones 48 and 50 may be used in order to remove the agglomerated particulates. In one embodiment, cyclone 48 may be a low velocity cyclone for removing the larger particulates. For example, gas velocities in the cyclone 48 may be from about 30 ft/sec to about 75 ft/sec.

The second cyclone 50, on the other hand, may be a high velocity, high efficiency cyclone well configured to removing smaller particulates such as fines. Gas velocity in the cyclone 50 may be, for instance, from about 50 ft/sec to about 200 ft/sec.

Once the particulate material is removed from the product gas stream using the cyclones 48 and 50, the product gas may be used in an almost limitless variety of processes. In one embodiment, for instance, as shown in FIG. 7, the product gas stream may be used for the production of electricity. As shown in FIG. 7, for instance, the product gas stream from the cyclone 50 is fed to a topping burner 52. The topping burner 52 includes a combustor that combusts the product stream and increases the gas temperature. For example, in one embodiment, the gas temperature can be increased to from about 2300° F. to about 2600° F. In order to combust the product gas stream, the topping burner may combine the product gas stream with an oxygen source, such as air if desired.

The combustor contained within the topping burner can be any suitable combustion device. In one embodiment, for instance, the combustor contained within the topping burner can be a pulse combustor or a low BTU fuel gas combustor. Examples of low BTU fuel gas combustors have been developed by GE Environmental Services, Inc. and Siemens Westinghouse Electric Corporation.

As shown in FIG. 7, the topping burner produces a flue gas stream that is then fed to the gas turbine 32. In particular, the flue gas stream is used to rotate a turbine 54 and produce electricity. As also shown in FIG. 7, in one embodiment, the flue gas stream exiting the turbine can be fed to a heat recovery steam generator 56 for generating steam from a feed water. The flue gas then exits the heat recovery steam generator 56 and is released to the atmosphere through a stack 58.

In an alternative embodiment, instead of sending the product gas stream to a gas turbine as shown in FIG. 7, the product gas stream can be fed to a fuel cell. In this embodiment, the topping burner 52 is not required. Instead, various gas conditioning and polishing systems may be incorporated into the system in order to purify the gas prior to being fed to the fuel cell. In particular, the gas conditioning and polishing systems may serve to concentrate the amount of hydrogen contained within the product gas for use in the fuel cell.

As described above, during the process of the present invention, sulfur is captured from the pulsating combustion stream. The sulfur is contained in the sulfur capturing agents. The sulfur capturing agents are collected within the fluid channel 14 and within the cyclones 48 and 50. In some embodiments, it may be desirable to further treat the agglomerated particles. In this regard, as shown in FIG. 7, the system further includes an atmospheric fluidized bed sulfater 60. In one embodiment, for instance, the sulfur capturing agent may be lime or limestone. Under a reducing environment as may occur in the fluid channel 14, sulfur captured by the sorbent is primarily through the formation of sulfide. Unfortunately, calcium sulfide reacts with water to release hydrogen sulfide. Consequently, safe disposal of spent sorbent requires conversion to the more stable sulfated form. In the process of the present invention, this conversion can easily take place within the sulfater 60.

Specifically, the solids collected from the pulse gasifier 10 and from the cyclones 48 and 50 as shown in FIG. 7 are fed through a pressure letdown 62 and into the sulfater 60. The solids caught from the cyclones contain both spent sorbents and unconverted carbon. The unconverted carbon is, in fact, a desired feature because it may be used to generate energy to maintain the sulfater at the required temperature for sulfide conversion.

Sulfur capture by lime/limestone is a complex process involving the following reactions:

$$CaO+SO_2+\tfrac{1}{2}O_2 \rightarrow CaSO_4 \tag{1}$$

$$CaO+SO_2+3CO \rightarrow CaS+3CO_2 \tag{2}$$

Depending on the temperature and the gas conditions, the following reactions may also occur:

$$CaSO_4+CO \rightarrow CaO+SO2+CO_2 \tag{3}$$

$$CaSO_4+4CO \rightarrow CaS+4CO_2 \tag{4}$$

$$CaS+1\tfrac{1}{2}O_2 \rightarrow CaO+SO_2 \tag{5}$$

$$CaS+2O_2 \rightarrow CaSO_4 \tag{6}$$

Under the operating conditions of interest in the second-stage, reaction (2) is expected to occur. In the AFBSC 60, however, reactions (3–6) may occur. Reaction (6) is desired. However, reaction (3) and (5) are sometimes undesirable as they result in the release of captured sulfur. Consideration of the Ca—O$_2$—S equilibrium diagram indicates that reaction (5) is most likely to occur under reducing conditions and at higher temperatures.

Thus, the sulfater is typically operated at temperatures lower than about 2,200° F. and under oxidizing conditions to form CaSO$_4$ and maintain the stability thereof. The sulfater, in keeping with these requirements, can be designed as a fluidized bed operating at a temperature of about 1,550° F. Air corresponding to super-stoichiometric operation is used to fluidize the bed, which can ensure that excess oxygen is available for the oxidation reaction and oxidizing conditions are maintained within the bed. Unconverted carbon from the second-stage is burned in the sulfater 60 to maintain the bed temperature at the desired level. Inspection of the phase equilibrium data for Ca—O$_2$—S system in the presence of carbon combustion products indicates that presence of CO will adversely affect sulfate formation. Excess oxygen feed in the sulfater will ensure dominance of CO$_2$. Additional fresh sorbent may also be supplied to the bed to ensure that sulfur oxides, if formed, can be captured within the bed.

As shown in FIG. 7, in one embodiment, raw coal may also be fed to the sulfater if carbon levels are too low. For most systems, however, the addition of a further fuel source to the sulfater 60 may be unnecessary.

When the sulfater 60 is incorporated into the system of the present invention, various energy integration steps may occur in order to further increase the efficiency of the overall process. For example, as shown in FIG. 7, in one embodiment, compressed air from the compressor 30 may be fed through the fluidized bed of the sulfater 60 and preheated. The preheated compressed air may then be fed to the topping burner 52 for combustion with the product gas stream. This is done to increase the heat input to the gas cycle. In addition, the fluidized bed may also incorporate tube banks designed to generate steam. Further, the resulting flue gas exiting the fluidized bed of the sulfater 60 may be fed to a heat recovery steam generator 64 for also creating steam. The steam from the fluidized bed, the steam from the heat recovery steam generator 64 and the steam from the heat recovery steam generator 56 may all then be fed to a steam turbine 66 to produce further amounts of electricity. Alternatively, the steam that is formed may be fed to the pulse gasifier 10 as desired.

As shown, once the flue gas stream produced by the sulfater 60 exits the heat recovery steam generator 64, the gas is fed to a baghouse 68 and filtered. Any particulates captured by the baghouse are sent to ash storage 70. The filtered gas, on the other hand, is fed to the stack 58 and released to the atmosphere.

Instead of using limestone as the sulfur capturing agent, as described above, in an alternative embodiment, cerium oxide may be used to capture sulfur. If a sorbent such as cerium oxide is used to capture sulfur, the spent sorbent may be regenerated in an air or oxygen-rich environment. The reaction will correspond to:

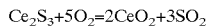

$$Ce_2S_3 + 5O_2 = 2CeO_2 + 3SO_2$$

The above reaction can occur, for instance, in a fluidized bed much like the sulfater 60 described in FIG. 7.

The $SO_2$ generated may be reduced using a direct sulfur reduction process or a Claus process to produce elemental sulfur or produce sulfuric acid or ammonium sulfate.

First-order estimates of the cycle efficiency for the combined cycle, such as shown in FIG. 7, were made for different fuel splits between the Pulse Gasifier and AFBSC. FIG. 8 shows the net plant efficiency (HHV basis) as a function of the fraction of the coal feed to the Pulse Gasifier. The value of 1 for this fraction corresponds to all the coal being fed into the Pulsed Gasifier and a value of zero corresponds to all the coal being fed into the AFBSC. Greenfield application would entail a coal feed fraction of near unity while retrofit application would correspond to low values (typically between 0.1 and 0.5) of this fraction. The net plant efficiency curves are shown for two cases: (1) 2,100° F. gas turbine inlet temperature and 1,450 psia/1,000° F./1,000° F. steam cycle, and 2) 2,300° F. gas turbine inlet temperature and 2,400 psia/1,000° F./1,000° F. steam cycle. Case 1 is typical of retrofit application and Case 2 is more suited to Greenfield application. The net plant efficiency increases with the fractional coal feed to the Pulse Gasifier as expected due to an increase in the higher temperature, more efficient gas cycle power generation. The net plant efficiency approaches 45 percent under the advanced cycle conditions relevant to Greenfield applications. Further improvements in efficiency are anticipated with steam-cooled gas turbine blades by substituting steam generated in the Pulse Gasifier for the compressed air. For a typical retrofit application, the net plant efficiency is projected between 33 and 37 percent. Of course, in all the cases, other benefits are also derived from the ability to meet ¹⁄₁₀th NSPS emissions targets, a simpler combustor island configuration without barrier filters and without the need for exotic sorbents.

The advantages of the pulsed gas combined cycle ("PGCC") in comparison with competing advanced power generation technologies are listed below in Table 1 based on a preliminary evaluation. The PGCC offers comparable performance with fewer components and shows potential for significant capital cost savings.

TABLE 1

|  | IGCC | | SECOND | | |
| --- | --- | --- | --- | --- | --- |
| GENERATION | $O_2$ | Air | PFBC | Transport | PGCC |
| BARRIER FILTER | Yes | Yes | Yes | Yes | No |
| SYNGAS COOLER | Yes | Yes | No | Yes | No |
| AIR SEPARATION UNIT | Yes | No | No | No | Yes |
| EX-SITU GAS CLEANUP | Yes | Yes | No | Yes | No |
| SULFUR RECOVERY | Yes | No | No | No | No |
| LIQUID EFFLUENT TREATMENT | Yes | No | No | No | No |
| EFFICIENCY, % (HHV basis) | 37–42 | 40–44 | 44–46 | ~45 | ~45 |
| SONIC-ENHANCED SULFUR CAPTURE | No | No | No | No | Yes |
| CAPITAL COST SAVING FOR PGCC, $/kW | 200–300 | 100–200 | 50–150 | 50–100 | — |

Further, the PGCC system can offer some or all of the following benefits:

Eliminates one or more stages of barrier filtration for hot gas particulate cleanup due to sonic-enhanced ash agglomeration. This enhances reliability, plant availability, reduces capital and operating and maintenance costs and requires less real estate.

Efficient in-situ sulfur capture in the sonic-enhanced mode together with sorbent regeneration and sulfur recovery improves performance, reduces waste, increase revenues and enhances economics.

Hot gas cleanup boosts process efficiency and lowers net heat rate.

Alternate fuels and/or biomass can be co-fired in the system.

Capital cost saving of between $200 and $300 per kW in comparison to current IGCC systems.

Provides modularity and is amenable to shop fabrication.

The system can be offered in small sizes (25 $MW_e$ equivalent or larger) and for niche applications involving feedstocks such as petroleum coke, bitumen, etc.

Suitable for re-powering as well as Greenfield applications.

Staged gasification mode of operation facilitates $NO_x$ emissions control and the flexibility to progressively increase the turbine inlet temperature (ultimately to 2,600° F.) with advances in gas turbines.

The combustor island can be 100 percent coal-fired and auxiliary fuel such as natural gas or fuel oil need be used only for start-up.

The pulse gasifier system can be retrofitted to an AFBC as an add-on or topper to make up a combined-cycle application.

Shows promise for achieving higher cycle efficiency (~45%), lower emissions (~1/10th NSPS), and lower cost of electricity.

No liquid effluent from the plant.

Provides modularity and is amenable to shop fabrication.

Permits staged or phased construction.

No exotic or unproven materials of construction.

The system can be configured for combined heat and power (CHP) application, for hydrogen production, for direct reduction of iron, or for the production of liquid fuels.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A process for producing a gas stream having fuel or heat value comprising:
   combusting a solid or liquid fuel in a pulse combustion device and creating a pulsating combustion stream and an acoustic pressure wave, the pulse combustion device operating at sub-stoichiometric conditions;
   communicating the pulsating combustion stream and acoustic pressure wave through a fluid channel, the fluid channel containing steam and being maintained under reducing conditions, over at least a section of the fluid channel, wherein organic components contained in the combustion stream undergo endothermic reaction to form hydrogen, the fluid channel including a first stage section and a second stage section, the reducing conditions being maintained in the second stage section, the first stage section having a first exit temperature and the second stage section having a second exit temperature, the first exit temperature being greater than the second exit temperature, the second exit temperature being less than about 1900° F.;
   injecting a sulfur capturing agent into the fluid channel, the sulfur capturing agent capturing sulfur contained in the pulsating combustion stream, the sulfur capturing agent also acoustically agglomerating with particles contained in the pulsating combustion stream; and
   filtering the combustion stream in order to remove agglomerated particles.

2. A process as defined in claim 1, wherein the first exit temperature is from about 2500° F. to about 3400° F.

3. A process as defined in claim 1, wherein steam is fed through the pulse combustion device in order to create the sub-stoichiometric conditions, the steam further serving to control the temperature of the pulsating combustion stream.

4. A process as defined in claim 1, wherein a solid or liquid fuel is injected into the fluid channel, the solid or liquid fuel undergoing endothermic reactions in the fluid channel for forming hydrogen.

5. A process as defined in claim 1, wherein the first stage section contains oxygen and is at a temperature sufficient to produce slag and wherein the process further includes the step of periodically removing slag from the fluid channel.

6. A process as defined in claim 5, wherein partial oxidation, steam gasification and slag formation all occur within the first stage section of the fluid channel.

7. A process as defined in claim 6, wherein only steam gasification occurs in the second stage section of the fluid channel.

8. A process as defined in claim 7, wherein the process further includes the step of injecting steam into the second stage section of the fluid channel.

9. A process as defined in claim 1, wherein the sulfur capturing agent has a median particle size of at least 20 microns.

10. A process as defined in claim 1, wherein the sulfur capturing agent comprises limestone, dolomite or mixtures thereof.

11. A process as defined in claim 1, wherein the sulfur capturing agent comprises cerium oxide.

12. A process as defined in claim 11, further comprising the step of heating the filtered agglomerated particles to a temperature sufficient for cerium oxide to be regenerated.

13. A process as defined in claim 1, further comprising the step of injecting an alkali gettering agent into the fluid channel and into contact with the pulsating combustion stream.

14. A process as defined in claim 1, wherein the acoustic pressure wave is at a frequency of from about 20 Hz to about 250 Hz, the acoustic pressure wave being at an intensity of at least about 150 dB.

15. A process as defined in claim 1, further comprising the step of spraying water into the second stage section in order to cool the pulsating combustion stream.

16. A process as defined in claim 15, wherein water is added to the second stage section in an amount up to about 5% of the mass flow rate of the combustion stream.

17. A process as defined in claim 1, wherein the combustion stream is filtered through a first cyclone and a second cyclone, the first cyclone comprising a low velocity cyclone, the second cyclone comprising a high velocity cyclone.

18. A process as defined in claim 1, wherein the agglomerated particles filtered from the combustion stream contain a sulfide and wherein the process further comprises the step of sulfating the sulfide.

19. A process as defined in claim 18, wherein the agglomerated particles are sulfated by being fed to a fluidized bed under oxidizing conditions, the fluidized bed being at a temperature of less than about 2200° F.

20. A process for producing a gas stream having fuel or heat value comprising:
   combusting a solid or liquid fuel in a pulse combustion device and creating a pulsating combustion stream and an acoustic pressure wave, the pulse combustion device operating at sub-stoichiometric conditions:
   communicating the pulsating combustion stream and acoustic pressure wave through a fluid channel, the fluid channel containing steam and being maintained under reducing conditions, over at least a section of the fluid channel, wherein organic components contained in the combustion stream undergo endothermic reactions to form hydrogen;
   injecting a sulfur capturing agent into the fluid channel, the sulfur capturing agent capturing sulfur contained in the pulsating combustion stream, the sulfur capturing agent also acoustically agglomerating with particles contained in the pulsating combustion steam filtering the combustion stream in order to remove agglomerated particles; and feeding the filtered combustion stream to a topping burner, the topping burner combusting the combustion stream in order to form a flue gas stream, the flue gas stream being fed to an electricity generating device for generating electricity.

21. A process as defined in claim 20, wherein the electricity generating device comprises a gas turbine or a steam turbine.

22. A process for producing a gas stream having fuel or heat value comprising:

combusting a solid or liquid fuel in a pulse combustion device and creating a pulsating combustion stream and an acoustic pressure wave, the pulse combustion device operating at sub-stoichiometric conditions;

communicating the pulsating combustion stream and acoustic pressure wave through a fluid channel, the fluid channel containing steam and being maintained under reducing conditions, over at least a section of the fluid channel, wherein organic components contained in the combustion stream undergo endothermic reactions to form hydrogen;

injecting a sulfur capturing agent into the fluid channel, the sulfur capturing agent capturing sulfur contained in the pulsating combustion stream, the sulfur capturing agent also acoustically agglomerating with particles contained in the pulsating combustion stream; and filtering the combustion stream in order to remove agglomerated particles: and wherein the filtered combustion stream is fed to a fuel cell for generating electricity.

23. A process for producing a gas stream having fuel or heat value comprising:

combusting a solid or liquid fuel in a pulse combustion device and creating a pulsating combustion stream and an acoustic pressure wave, the acoustic pressure wave having a frequency of from about 25 Hz to about 250 Hz, the pulse combustion device operating under sub-stoichiometric conditions;

directing the pulsating combustion stream through a fluid channel, the fluid channel including a first stage section and a second stage section, the first stage section having a first exit temperature and the second stage section having a second exit temperature, the first exit temperature being greater than the second exit temperature;

feeding steam into the pulse combustion device in conjunction with the solid or liquid fuel, steam being present in the pulse combustion device in an amount sufficient to maintain the temperature in the first stage section of the fluid channel below about 3500° F., partial oxidation, steam gasification, and slag formation all occurring in the first stage section of the fluid channel;

periodically removing slag from the fluid channel;

injecting a sulfur capturing agent into the second stage section of the fluid channel, the sulfur capturing agent capturing sulfur contained in the pulsating combustion stream, the sulfur capturing agent also acoustically agglomerating with particles contained in the pulsating combustion stream;

maintaining reducing conditions in the second stage section of the fluid channel, steam gasification occurring in the second stage section causing the formation of hydrogen; and filtering the combustion stream leaving the second stage section of the fluid channel in order to remove agglomerated particles.

24. A process as defined in claim 23, wherein the filtered combustion stream is fed to a turbine for generating electricity.

25. A process as defined in claim 23, wherein the filtered combustion stream is fed to a fuel cell for generating electricity.

26. A process as defined in claim 23, wherein steam is fed into the second stage section of the fluid channel for maintaining reducing conditions.

27. A process for producing a gas stream having fuel or heat value comprising:

combusting a solid or liquid fuel in a pulse combustion device and creating a pulsating combustion stream and an acoustic pressure wave, the pulse combustion device operating at sub-stoichiometric conditions by feeding steam through the pulse combustion device, the steam further serving to control the temperature of the pulsating combustion stream;

communicating the pulsating combustion stream and acoustic pressure wave through a fluid channel, the fluid channel containing steam and being maintained under reducing conditions, over at least a section of the fluid channel, wherein organic components contained in the combustion stream undergo endothermic reactions to form hydrogen;

injecting a sulfur capturing agent into the fluid channel, the sulfur capturing agent capturing sulfur contained in the pulsating combustion stream, the sulfur capturing agent also acoustically agglomerating with particles contained in the pulsating combustion stream; and filtering the combustion stream in order to remove agglomerated particles.

28. A process for producing a gas stream having fuel or heat value comprising:

combusting a solid or liquid fuel in a pulse combustion device and creating a pulsating combustion stream and an acoustic pressure wave, the pulse combustion device operating at sub-stoichiometric conditions;

communicating the pulsating combustion stream and acoustic pressure wave through a fluid channel and injecting a solid or liquid fuel into the fluid channel, the fluid channel containing steam and being maintained under reducing conditions over at least a section of the fluid channel, wherein organic components including the solid or liquid fuel contained in the combustion stream undergo endothermic reactions to form hydrogen;

injecting a sulfur capturing agent into the fluid channel, the sulfur capturing agent capturing sulfur contained in the pulsating combustion stream, the sulfur capturing agent also acoustically agglomerating with particles contained in the pulsating combustion stream; and filtering the combustion stream in order to remove agglomerated particles.

29. A process for producing a gas stream having fuel or heat value comprising:

combusting a solid or liquid fuel in a pulse combustion device and creating a pulsating combustion stream and an acoustic pressure wave, the pulse combustion device operating at sub-stoichiometric conditions;

communicating the pulsating combustion stream and acoustic pressure wave through a fluid channel, the fluid channel containing steam and being maintained under reducing conditions, over at least a section of the fluid channel, wherein organic components contained in the combustion stream undergo endothermic reactions to form hydrogen;

injecting a sulfur capturing agent into the fluid channel, the sulfur capturing agent comprising cerium oxide, the sulfur capturing agent capturing sulfur contained in the pulsating combustion stream, the sulfur capturing agent also acoustically agglomerating with particles contained in the pulsating combustion stream; and filtering the combustion stream in order to remove agglomerated particles.

* * * * *